(No Model.)
J. M. RAUHOFF.
WORM SCREW.
No. 560,281. Patented May 19, 1896.
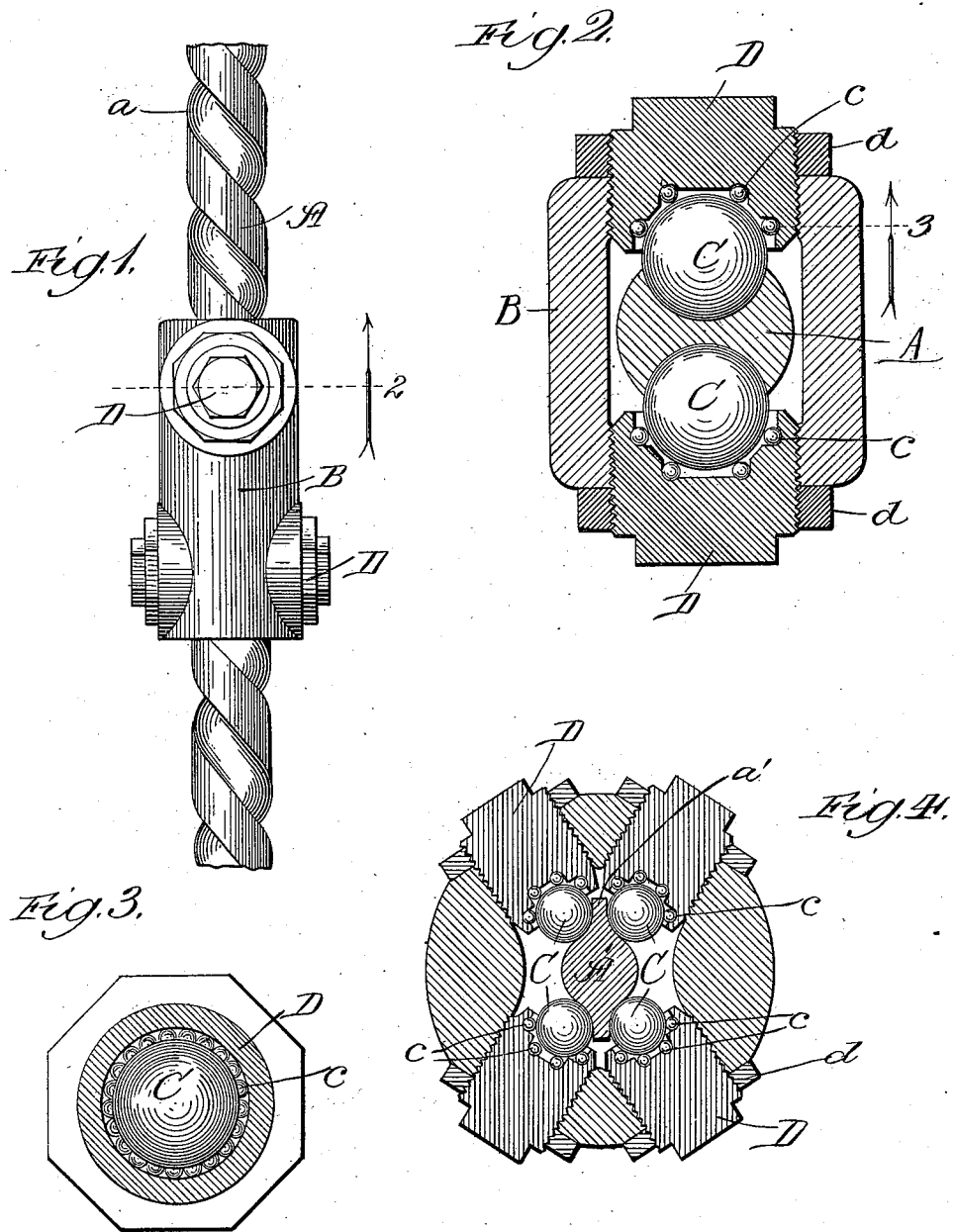
Witnesses:
Inventor:
John M. Rauhoff,

UNITED STATES PATENT OFFICE.

JOHN M. RAUHOFF, OF CHICAGO, ILLINOIS, ASSIGNOR OF TWO-THIRDS TO BRAMAN H. LOVELESS, OF SAME PLACE, AND JAMES SAUNDERS, OF MARIETTA, GEORGIA.

WORM-SCREW.

SPECIFICATION forming part of Letters Patent No. 560,281, dated May 19, 1896.

Application filed August 23, 1895. Serial No. 560,216. (No model.)

*To all whom it may concern:*

Be it known that I, JOHN M. RAUHOFF, a citizen of the United States, residing at Chicago, Illinois, have invented certain new and useful Improvements in Worm-Screws, of which the following is a specification.

The object of my invention is to facilitate the movement of a worm-screw through the sleeve or collar by which it is rotated; and the invention consists in features and details of construction hereinafter described and claimed.

In the drawings, Figure 1 is a side elevation showing a worm-screw and its collar or sleeve; Fig. 2, a transverse section taken in line 2 of Fig. 1; Fig. 3, an end elevation of a section taken in line 3 of Fig. 2, and Fig. 4 a transverse section showing a modified form in which the invention is applied.

In making my improvement in worm-screws I have found that it is applicable to a great many different forms and may be used in a great many different ways. I have illustrated two forms in which it may be used, but intend them simply as samples, and desire it to be understood that I intend in my claim to cover the principle broadly, so that departures may be made from the specific examples or illustrations shown in the drawings. In the examples shown I make a worm-screw A, either by providing its rod or shaft with a spiral groove or grooves *a* or by providing it with spiral flanges *a'*. This modified form of worm-screw is shown in Fig. 4, where it is indicated by the letter A'. I shall use the term "bearing-surface" to indicate either the spiral grooves or the spiral flanges, so that either will be understood as comprehended by the term.

I make a sleeve or collar B, which may be moved in any appropriate way and by any appropriate motive power back and forth on the rod or shaft, though if preferred the sleeve or collar may remain in a stationary position and the rod or shaft moved back and forth through it by any appropriate means. In the sleeve or collar I arrange balls C, adapted to rest against the bearing-surface of the rod or shaft. These balls are arranged in pockets or recesses in the collar adapted to receive them, so that they may turn freely therein, and I prefer to employ a number of small balls or steel shot *c* to facilitate the turning of the balls in their recesses or pockets. The object of these balls is to obviate friction and to enable the sleeve to be moved on the rod without difficulty or wear in the parts.

In the illustrations I have made the pockets or recesses for the balls in the ends of the screw-plugs D, which are then screwed into the screw-threaded holes in the sleeve or collar adapted to receive them. These plugs may be more securely held in place by a jam or lock nut *d*, so that when they are adjusted they will remain in the desired position to keep the balls in proper contact with the bearing-surface of the rod or shaft.

What I regard as new, and desire to secure by Letters Patent, is—

The combination of a rod or shaft provided with a spiral bearing-surface of long pitch, a non-rotary collar or sleeve surrounding the rod or shaft and adapted to impart a rotary movement to it by a sliding of the one or the other in a direction longitudinal to the axis of the rod or shaft, and balls resting on balls and interposed between the collar or sleeve and the spiral bearing-surface of the rod or shaft so as to be operated by contact therewith.

JOHN M. RAUHOFF.

Witnesses:
THOMAS A. BANNING,
ANNIE C. COURTENAY.